(12) United States Patent
Xu et al.

(10) Patent No.: US 12,432,165 B2
(45) Date of Patent: Sep. 30, 2025

(54) MULTI-PACKET SLIDING WINDOW SCHEDULER AND METHOD FOR INPUT-QUEUED SWITCHES

(71) Applicant: Georgia Tech Research Corporation, Atlanta, GA (US)

(72) Inventors: Jun Xu, Atlanta, GA (US); Long Gong, Atlanta, GA (US); Jingfan Meng, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 241 days.

(21) Appl. No.: 18/020,822

(22) PCT Filed: Aug. 11, 2021

(86) PCT No.: PCT/US2021/045496
§ 371 (c)(1),
(2) Date: Feb. 10, 2023

(87) PCT Pub. No.: WO2022/035935
PCT Pub. Date: Feb. 17, 2022

(65) Prior Publication Data
US 2023/0269202 A1 Aug. 24, 2023

Related U.S. Application Data

(60) Provisional application No. 63/064,000, filed on Aug. 11, 2020.

(51) Int. Cl.
*H04L 49/00* (2022.01)
*H04L 47/22* (2022.01)
*H04L 47/28* (2022.01)

(52) U.S. Cl.
CPC ........ *H04L 49/3045* (2013.01); *H04L 47/225* (2013.01); *H04L 47/28* (2013.01); *H04L 49/3027* (2013.01)

(58) Field of Classification Search
CPC .... H04L 47/28; H04L 47/225; H04L 49/3045
See application file for complete search history.

(56) References Cited

U.S. PATENT DOCUMENTS 7,187,669 B1 * 3/2007 Lee ...................... H04L 12/2861
370/347
8,274,996 B1 * 9/2012 Yuan ...................... H04L 1/1887
370/473

(Continued)

OTHER PUBLICATIONS

International Preliminary Report on Patentability issued for Application No. PCT/US2021/045496, dated Feb. 23, 2023.

(Continued)

*Primary Examiner* — Melanie Jagannathan
(74) *Attorney, Agent, or Firm* — Meunier Carlin & Curfman LLC

(57) ABSTRACT

An exemplary sliding window scheduling method and system are disclosed. The exemplary sliding window scheduling method and system can schedule multiple packets in a given scheduling frame with a sliding window scheduling frame. The scheduling operation can be performed using bitmap operators and can achieve a lowest time complexity of O(1) per matching computation and per port using distributed parallelization hardware. The exemplary sliding window scheduling method and system can be performed in the context of a queue-proportional scheduler (QPS) as well as iSLIP. In alternative embodiments, the SW-QPS operation can be performed in a batching window rather than in a sliding window.

20 Claims, 8 Drawing Sheets

(56) References Cited

U.S. PATENT DOCUMENTS

| | | | |
|---|---|---|---|
| 2002/0181483 A1 | 12/2002 | Oki et al. | |
| 2002/0191626 A1* | 12/2002 | Moriwaki | H04L 49/352 370/413 |
| 2003/0035422 A1* | 2/2003 | Hill | H04L 49/30 370/389 |
| 2005/0190795 A1* | 9/2005 | Abel | H04L 49/254 370/386 |
| 2005/0271069 A1* | 12/2005 | Bianco | H04L 49/3045 370/412 |
| 2006/0285548 A1* | 12/2006 | Hill | H04Q 3/68 370/418 |
| 2007/0223483 A1* | 9/2007 | Huang | H04L 49/90 370/474 |
| 2008/0159145 A1 | 7/2008 | Muthukrishnan et al. | |
| 2011/0044174 A1* | 2/2011 | Szymanski | H04L 47/6295 370/238 |
| 2014/0269294 A1 | 9/2014 | Morandin et al. | |
| 2018/0262437 A1* | 9/2018 | Han | G06F 9/4887 |
| 2020/0127936 A1* | 4/2020 | Luo | H04L 47/522 |
| 2020/0348968 A1* | 11/2020 | Huchachar | G06F 9/445 |
| 2021/0019085 A1* | 1/2021 | Zhu | G06F 13/4282 |

OTHER PUBLICATIONS

G. Aggarwal, R. Motwani, D. Shah, and An Zhu. 2003. Switch Scheduling via Randomized Edge Coloring. In Proceedings of the IEEE FOCS. 502-512.

M. Bayati, B. Prabhakar, D. Shah, and M. Sharma. 2007. Iterative Scheduling Algorithms. In Proceedings of the IEEE Infocom. 445-453.

C. Cakir, R. Ho, J. Lexau, and K. Mai. 2016. Scalable High-Radix Modular Crossbar Switches. In Proceedings of the HOTI. 37-44.

R. Duan and H. Su. 2012. A Scaling Algorithm for Maximum Weight Matching in Bipartite Graphs. In Proceedings of the ACM-SIAM SODA. 1413-1424.

M. Fayyazi, D. Kaeli, and W. Meleis. 2004. Parallel Maximum Weight Bipartite Matching Algorithms for Scheduling in Input-Queued Switches. In Proceedings of the IEEE IPDPS (New Mexico, USA). 4-11.

J.M. Flegal, G.L. Jones, et al. 2010. Batch Means and Spectral Variance Estimators in Markov Chain Monte Carlo. The Annals of Statistics 38, 2 (2010), 1034-1070.

P. Giaccone, B. Prabhakar, and D. Shah. 2003. Randomized Scheduling Algorithms for High-Aggregate Bandwidth Switches. IEEE J. Sel. Areas Commun. 21, 4 (2003), 546-559.

P.W. Glynn, W. Whitt, et al. 1992. The Asymptotic Validity of Sequential Stopping Rules for Stochastic Simulations. Ann. Appl. Probab. 2, 1 (1992), 180-198.

L. Gong, P. Tune, L. Liu, S. Yang, and J. Xu. 2017. Queue-Proportional Sampling: A Better Approach to Crossbar Scheduling for Input-Queued Switches. Proceedings of the ACM SIGMETRICS 1, 1 (Jun. 2017), 3:1-3:33.

Long Gong, Jun Xu, Liang Liu, and Siva Theja Maguluri. 2020. QPS-r: A Cost-Effective Crossbar Scheduling Algorithm and Its Stability and Delay Analysis. In Proceedings of the EAI VALUETOOLS.

B. Hu, F. Fan, K. L. Yeung, and S. Jamin. 2018. Highest Rank First: A New Class of Single-Iteration Scheduling Algorithms for Input-Queued Switches. IEEE Access 6 (2018), 11046-11062.

B. Hu, K. L. Yeung, Q. Zhou, and C. He. 2016. On Iterative Scheduling for Input-Queued Switches With a Speedup of 2 - 1/N. IEEE/ACM Trans. Netw. 24, 6 (Dec. 2016), 3565-3577.

M. Karol, M. Hluchyj, and S. Morgan. 1987. Input Versus Output Queueing on a Space-Division Packet Switch. IEEE Trans. Commun. 35, 12 (1987), 1347-1356.

Nick McKeown. 1999. The iSLIP Scheduling Algorithm for Input-queued Switches. IEEE/ACM Trans. Netw. 7, 2 (Apr. 1999), 188-201.

N. McKeown, A. Mekkittikul, V. Anantharam, and J. Walrand. 1999. Achieving 100% Throughput in an Input-Queued Switch. IEEE Trans. Commun. 47, 8 (Aug. 1999), 1260-1267.

M. J. Neely, E. Modiano, and Y. S. Cheng. 2007. Logarithmic Delay for N x N Packet Switches Under the Crossbar Constraint. IEEE/ACM Trans. Netw. 15, 3 (Jun. 2007), 657-668.

D. Shah and D. Wischik. 2006. Optimal Scheduling Algorithms for Input-Queued Switches. In Proc. of the IEEE INFOCOM. 1-11.

L. Wang, T. Ye, T. Lee, and W. Hu. 2018. A Parallel Complex Coloring Algorithm for Scheduling of Input-Queued Switches. IEEE Trans. Parallel Distrib. Syst. 29, 7 (2018), 1456-1468.

International Search Report and Written Opinion received in PCT/US2021/045496 mailed Dec. 14, 2021, 14 pages.

\* cited by examiner

MULTI-PACKET SLIDING WINDOW SCHEDULER AND METHOD FOR INPUT-QUEUED SWITCHES

RELATED APPLICATION

This application is a U.S. National Stage application filed under 35 U.S.C. § 371 of PCT/US2021/045496 filed Aug. 11, 2021, which claims the benefit of priority to U.S. Provisional Application No. 63/064,000, filed Aug. 11, 2020, entitled "Interactive Switching Algorithm for Input-Queued Switches," which is incorporated by reference herein in its entirety.

STATEMENT OF GOVERNMENT INTEREST

This invention was made with government support under GR00000507 awarded by the National Science Foundation. The government has certain rights in the invention.

BACKGROUND

Internet routers and datacenter switches typically employ an input-queued crossbar to interconnect their input ports and output ports. In an input-queued crossbar switch, each input port has a number of virtual output queues. The virtual output queues at a given input port serve as a buffer for the packets going into the input port that is destined for an output port. In an input-queued crossbar switch, only one input port can be connected to an output port in a given switching cycle or time slot. In every time slot, the switch needs to compute a one-to-one matching (i.e., the crossbar schedule) between input and output ports.

Switching algorithms that are executable or implementable in specialized hardware, such as a switching ASICs, must compute high-quality matchings—those that result in high switch throughput and low queueing delays for packets—in a short time slot, typically within a few nanoseconds. Switching ASICs for a 256-port switch configured for a 100 Gbps line rate with a 128-byte cell size must perform 256×256 matching in every ten nanoseconds. While many switching algorithms have been proposed for input-queued switches, they either have a (relatively) high time complexity that prevents a matching computation from being completed in a short time slot or cannot produce high-quality matchings that translate into excellent throughput and delay performances.

There is a benefit to improve the scheduling of input-queued crossbar switches.

SUMMARY

An exemplary sliding window scheduling method and system are disclosed. The exemplary sliding window scheduling method and system can schedule multiple packets in a given scheduling frame with a sliding window scheduling frame. The scheduling operation can be performed using bitmap operators and can achieve the lowest time complexity of O(1) per matching computation and per port using distributed parallelization hardware. The exemplary sliding window scheduling method and system can be performed in the context of a queue-proportional scheduler (QPS) referred to herein as sliding window QPS (SW-QPS), as well as iSLIP, referred to herein as sliding window iSLIP (SW-iSLIP). In alternative embodiments, the SW-QPS operation can be performed in a batching window rather than in a sliding window, referred to herein as "batch-QPS" or "SB-QPS."

In an aspect, a network switch (e.g., input-queue switch performing SW-QPS) is disclosed comprising a plurality of input ports and a plurality of output ports operatively interconnected to one another in a crossbar, wherein each of the plurality of input ports comprises a plurality of virtual output queue (VOQ) buffers that are mapped to an output report, wherein each of the plurality of VOQ buffers is configured to store a plurality of packet received at a given input port of the plurality of input ports; an input port scheduler configured, via computer-readable instructions or logic configuration implemented at each input port of the plurality of input ports, to at each switching cycle (e.g., schedule-able time slot), send a pairing request to an output port associated with a VOQ buffer of an input port, wherein the VOQ buffer has at least one packet, wherein the VOQ buffer is randomly selected according to a sampling distribution (e.g., queue-proportional sampling distribution), and wherein the pairing request includes i) an indication of a VOQ length for the VOQ buffer and ii) availability slots; and an output port scheduler configured, via computer-readable instructions or logic configuration implemented at each output port of the plurality of output ports, to at the each switching cycle or a predefined subsequent switching cycle, if receiving a pairing request, (i) receive one or more pairing requests from a corresponding set of one or more input ports, (ii) select one or more pairing requests among the one or more received pairing requests (e.g., having a longest VOQ packet length) that can fit in an available time slot in a sliding window of available time slots using the indication of a VOQ length and the availability slots, and (iii) send an accept message to an input port associated with the selected pair request, wherein the plurality of output ports receives packets from the plurality of input ports over the crossbar to direct the packets to pre-defined destinations according to a schedule defined by the input port scheduler and the output port scheduler.

In some embodiments, an input port scheduler of a first input port of the plurality of input ports is configured to compute a queue-proportional sampling distribution for the first input port as a plurality of ratios associated with a VOQ buffer, and wherein each ratio of the plurality of ratios is determined as (i) a number of packets in a given VOQ buffer to (ii) a total number of packets in the VOQ buffers of the first input port, and wherein the VOQ buffer is randomly selected according to the queue-proportional sampling distribution.

In some embodiments, the pairing request is selected in the first available time slot in the sliding window of available time slots.

In some embodiments, the pairing request having a longest VOQ packet length is selected in the first available time slot in the batch window of available time slots.

In some embodiments, the output port scheduler is configured to select (i) the selected pair request as a first selected pair request and (ii) a second selected pairing request within a same switching cycle.

In some embodiments, the selection of the first selected pair request and the second selected pairing request is based on a first-fit-accepting (FFA) policy.

In some embodiments, the network switch is configured as an Internet router or a datacenter switch.

In some embodiments, the pairing request includes a bitmap of availability slots.

In some embodiments, the output port scheduler maintains a bitmap of the sliding window of available time slots.

In some embodiments, the output port scheduler is configured to perform a bit operation between the bitmap of availability slots and the bitmap of the sliding window of available time slots to perform the selecting of the one or more pairing requests.

In another aspect, a method is disclosed comprising providing a plurality of input ports and a plurality of output ports operatively interconnected to one another in a crossbar, wherein each of the plurality of input ports comprises a plurality of virtual output queue (VOQ) buffers that are mapped to an output report, wherein each of the plurality of VOQ buffers is configured to store a plurality of packet received at a given input port of the plurality of input ports; at each input port of the plurality of input ports, and at each switching cycle, sending a pairing request to an output port associated with a VOQ buffer of an input port, wherein the VOQ buffer has at least one packet, (e.g., wherein the VOQ buffer is randomly selected according to a sampling distribution (e.g., queue-proportional sampling distribution)), and wherein the pairing request includes i) an indication of a VOQ length for the VOQ buffer and ii) availability slots; and at each output port of the plurality of output ports, and at the each switching cycle or a pre-defined subsequent switching cycle, (i) receiving one or more pairing requests from a corresponding set of one or more input ports, (ii) selecting one or more pairing requests among the one or more received pairing requests (e.g., having a longest VOQ packet length) that can fit in an available time slot in a sliding window of available time slots using the indication of a VOQ length and the availability slots, and (iii) sending an accept message to an input port associated with the selected pair request, wherein the plurality of output ports receive packets from the plurality of input ports over the crossbar to direct the packets to pre-defined destinations according to a schedule defined by the input port scheduler and the output port scheduler.

In some embodiments, an input port scheduler of a first input port of the plurality of input ports is configured to compute a queue-proportional sampling distribution for the first input port as a plurality of ratios associated with a VOQ buffer, and wherein the queue-proportional sampling distribution is determined as a ratio of (i) a number of packets in a given VOQ buffer to (ii) a total number of packets in the VOQ buffers of the input port.

In some embodiments, the pairing request is selected in the first available time slot in the sliding window of available time slots.

In some embodiments, the pairing request having a longest VOQ packet length is selected in the first available time slot in the batch window of available time slots.

In some embodiments, the method further includes selecting a second selected pairing request within a same time slot with the selected pair request as a first selected pair request.

In some embodiments, the selection of the first selected pair request and the second selected pairing request is based on a first-fit-accepting (FFA) policy.

In some embodiments, the pairing request includes a bitmap of availability slots.

In some embodiments, the output port scheduler maintains a bitmap of the sliding window of available time slots.

In some embodiments, the output port scheduler is configured to perform a bit operation between the bitmap of availability slots and the bitmap of the sliding window of available time slots to perform the selecting of the one or more pairing requests.

In another aspect, a network switch (e.g., input-queue switch performing SW-SLIP) comprising a plurality of input ports and a plurality of output ports operatively interconnected to one another in a crossbar, wherein each of the plurality of input ports comprises a plurality of virtual output queue (VOQ) buffers that are mapped to an output report, wherein each of the plurality of VOQ buffers is configured to store a plurality of packet received at a given input port of the plurality of input ports; an output port scheduler configured, via computer-readable instructions or logic configuration implemented at each output port of the plurality of output ports, to at each switching cycle (e.g., schedule-able time slot), send a pairing request to an output port associated with a VOQ buffer of an input port, wherein the VOQ buffer has at least one packet, wherein the pairing request includes a list of one or more availability slots; and an input port scheduler configured, via computer-readable instructions or logic configuration implemented at each input port of the plurality of output ports, to at the each switching cycle or a pre-defined subsequent switching cycle, if receiving a pairing request, (i) receive one or more pairing requests from a corresponding set of one or more output ports, (ii) select one or more pairing requests among the one or more received pairing requests that can fit in an available time slot in a sliding window of available time slots using the list of one or more availability slots, and (iii) send an accept message to an output port associated with the selected pair request, wherein the plurality of output ports receives packets from the plurality of input ports over the crossbar to direct the packets to pre-defined destinations according to a schedule defined by the input port scheduler and the output port scheduler.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the 1$^{st}$ reference in the list. All references cited and discussed in this specification are incorporated herein by reference in their entireties and to the same extent as if each reference was individually incorporated by reference.

Example System and Method of Operations

Figure 1:
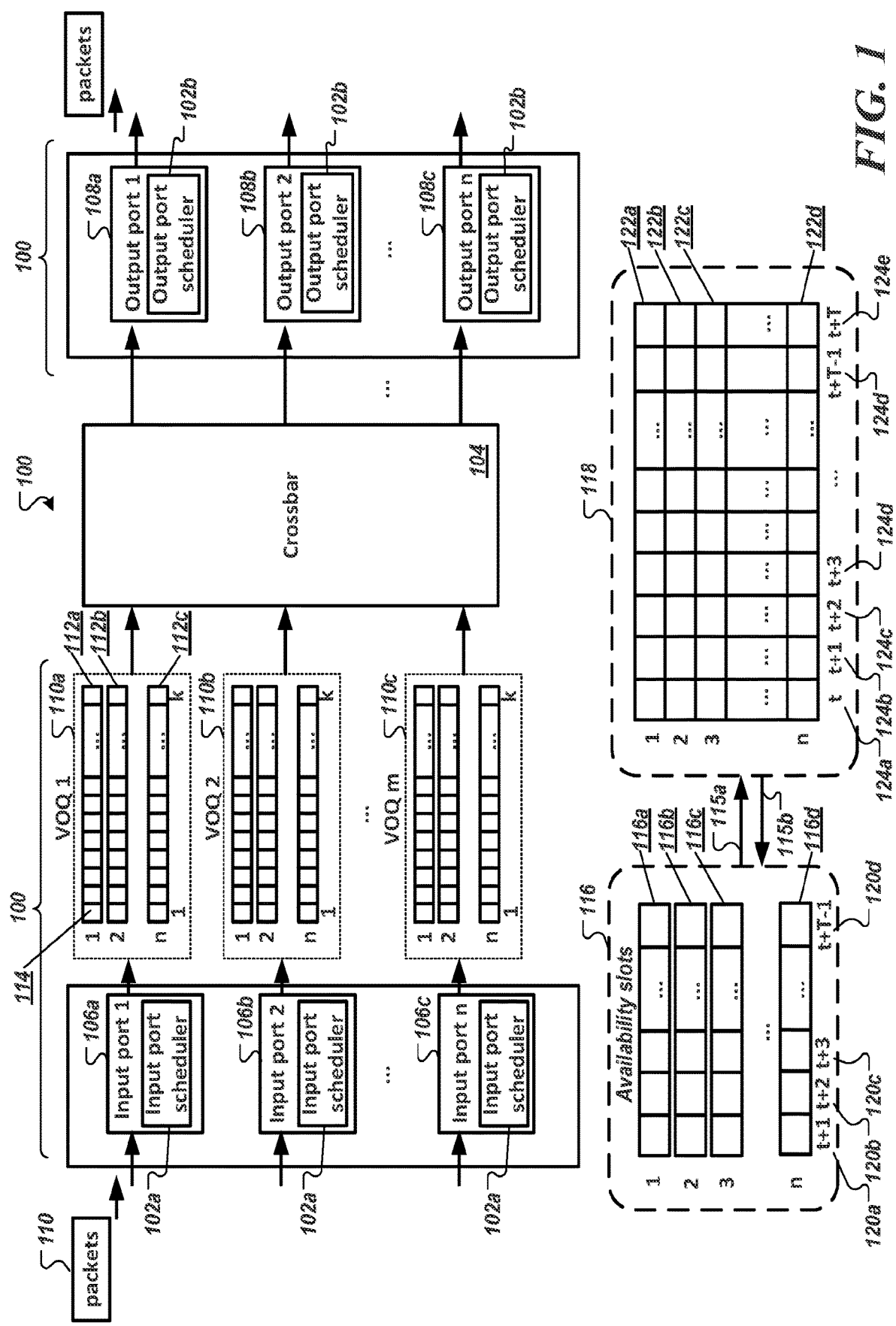
FIG. 1 shows an input-queued switch configured with a sliding window scheduler that collectively operates to schedule routing of packets over a crossbar within a sliding window scheduling frame in accordance with an illustrative embodiment.

FIG. 1 shows an input-queued switch 100 configured with a sliding window scheduler 102 (shown as "Input port scheduler" 102a and "Output port scheduler" 102b) that collectively operates to schedule routing of packets over a crossbar 104 within a sliding window scheduling frame in accordance with an illustrative embodiment. In the example shown in FIG. 1, the crossbar 104 operatively connects a set of ingress ports 106 (shown as "Input port 1" 106a, "Input port 2" 106b, and "Input port n" 106c) to a set of egress ports 108 (shown as "Output port 1" 108a, "Output port 2" 108b, and "Output port n" 108c). The terms "input port" and "ingress port" and the terms "output port" and "egress port" are interchangeably used herein. The sliding window scheduler operation can beneficially achieve, in certain implementations, a high-quality match with low time complexity of O(1) per matching computation and per port. The sliding window scheduler 102 comprising the input port schedulers 102a and the output port schedulers 102b are, preferably, implemented in distributed parallel hardware located at each of the ingress ports 106 and the output ports 108. A singular reference to sliding window scheduler 102 refers to its collective operation.

Each of the ingress port 106 includes a physical buffer on the ingress pipeline, e.g., of each packet forwarding engine (PFE), to store traffic 110 (shown as "packets" 110) for every egress port 108. The ingress port 106 can maintain a group of virtual output queues (VOQ) 110 in the physical buffer in which the number of groups corresponds to the number of ingress port 106 (shown in the example of FIG. 1 as "VOQ 1" group 112a, "VOQ 2" group 110b, and "VOQ group n" 110c). Each VOQ group 110 of each ingress port 106 can include a virtual output queue that corresponds to the number of egress ports 108 (shown as VOQ "1" 112a, VOQ "2" 112b, VOQ "n" 112c) in which each VOQ 112 include k number of cells 114 (shown as "1 . . . k"). Each cell preferably stores one packet, though it could be one or more packets. The sliding window scheduler 102 can operate on unicast or multicast traffic. In some embodiment, multiple schedulers can be implemented: one for unicast traffic and a second for multicast traffic (not shown).

The input-queued switch 100 can implement, in specialized hardware, e.g., application-specific circuits (ASICs) or network processor unit (NPUs), a scheduling algorithm. A queue-proportional scheduler (QPS)-based scheduling algorithm referred to herein as sliding window QPS (SW-QPS) and an iSLIP-based scheduling algorithm referred to herein as sliding window iSLIP (SW-iSLIP) are described herein as an example of a multi-packet sliding window scheduling algorithm, though it should be understood that the multiple-packet scheduling over a sliding window frame can be applied to other scheduling algorithms. In another embodiment, the queue-proportional scheduler (QPS)-based scheduling algorithm can also be implemented in a batching window framework, which is referred to herein as batch-QPS.

In the context of a QPS-based algorithm, the input port scheduler 102a is configured to transmit (shown as 115a), at each schedulable time slot, a set of availability slots 116 (shown as availability slot "1" 116a, availability slot "2" 116b, availability slot "3" 116c, and availability slot "n" 116d) corresponding to the availability of the ingress ports {1, 2, . . . , n} to the output port scheduler. In the context of an iSLIP-based algorithm, the output port scheduler 102b, which maintains the schedule 118 (also referred to herein as a "joint calendar" 118), is configured to send (shown as 115b) the set of availability slots to the input port scheduler 102a. In iSLIP operation, as later described herein, the input port scheduler 102a initially sends requests for the availability slots.

In the example of FIG. 1, the availability slots (e.g., 116a, 116b, 116c, 116d) are shown for a schedulable time slot of t+1 to t+T−1 (shown as 120a, 120b, 120c, 120d) in which t is the current time slot that the egress ports 108 are outputting traffic, and T is the size of the sliding window schedule 118. The transmitted set of availability slots 116 may be provided as a bit vector in which each bit corresponds to the availability of an ingress port (e.g., 106a, 106b, 106c) over a pre-defined scheduling window (e.g., t+T−1). The bit vectors may be consolidated by the input scheduler 102a into a single bit vector map for all of the ingress ports 106.

The output port scheduler 102b maintains the sliding window schedule 118. The schedule 118 includes a series of egress schedules 122 (shown as egress schedule "1" 122a, egress schedule "2" 122b, egress schedule "3" 122c, egress schedule "n" 122d) in which each schedule (e.g., 122a, 122b, 122c, 122d) corresponds to an egress port (e.g., 108a, 108b, 108c). Each egress schedule (e.g., 122a, 122b, 122c, 122d) includes the schedulable time slots 124 (shown as current time slot "t" 124a, next time slot "t+1" 124b, time slot "t+2" 124c, time slot "t+3" 124d to time slot "t+T−1" 142e) in which t is still the current time slot that the egress ports 108 are outputting traffic and T is a new slidable window that is being inserted.

The sliding window schedule 118 can be implemented in a circular buffer so T can be the size or depth of the buffer. The sliding window buffer size T is preferably 8 slot, 10 slots, 12 slots, 14 slots, 16 slots, 18 slots, 20 slots, 24 slots, 28 slots, 32 slots, 36 slots, 40 slots, 44 slots, or 48 slots, though can be any number of slots.

Sliding Window Queue Proportional Scheduler (SW-QPS)

Figure 2:
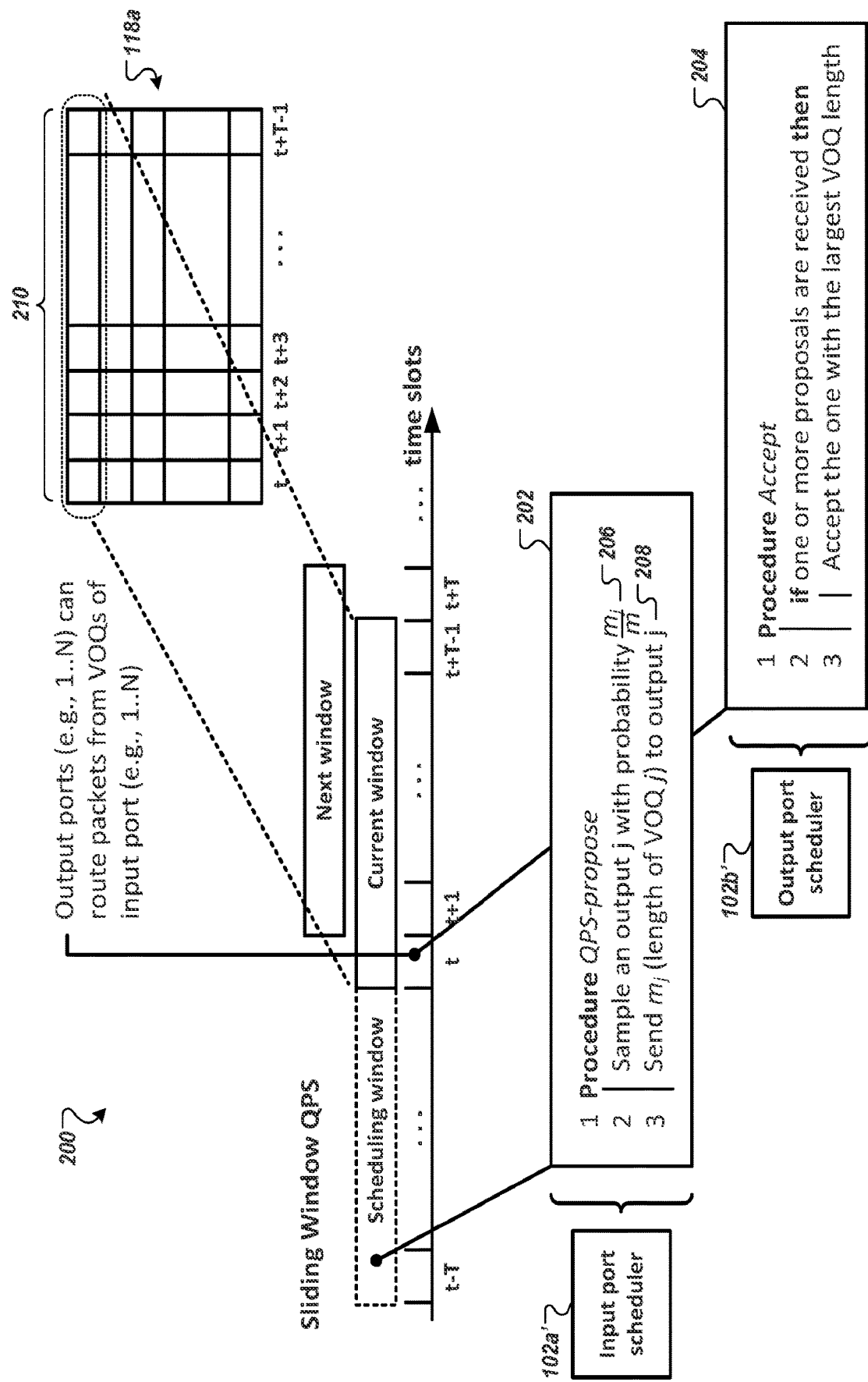
FIG. 2 shows an example scheduler configured as a sliding window queue proportional scheduler for the input-queued switch of FIG. 1 in accordance with an illustrative embodiment.

FIG. 2 shows an example scheduler 102 (shown as input scheduler 102a' and output scheduler 102b') configured as a sliding window queue proportional scheduler 200 for the input-queued switch of FIG. 1 in accordance with an illustrative embodiment.

To populate the schedule 118 (shown as 118a), the QPS framework includes a QPS propose stage 202 and a QPS accept stage 204 that can be implemented in the input port scheduler 102a' and output port scheduler 102b' in the respective ingress ports 106 and the egress ports 108. The input scheduler 102a' is configured, in the QPS-propose stage 202, at each ingress port 106, to (i) sample (206) a VOQ 110 corresponding to an egress output 108 according to queue proportional distribution (shown as $$\frac{m_j}{m}$$

in which $m_j$ is the length of the queue of the VOQ j at a given input port a, and m is the total queue of the VOQ of an ingress port, and (ii) send (208) a pairing request comprising the length $m_j$ of the sampled VOQ j to egress port j. The total queue m can be determined as $$m \triangleq \sum_{k=1}^{N} m_k.$$

The pairing request also includes the availability slots 116 discussed in relation to FIG. 1. As discussed above, each VOQ for a given ingress port is associated with an egress port. Multiple ingress ports 106 can send multiple pairing messages to the same egress port 108.

The output scheduler 102b', at each egress port 108, is configured in the QPS-accept stage 208 to received one or more pairing requests from the input ports 106 (or not receive one at all for a given time slot). The pairing requests can be consolidated into a single message for all ingress ports, or individual pairing requests can be sent to the output schedulers of the egress ports 108. If a pairing request is received for a given time slot t, the output scheduler 102b' can apply a policy to accommodate the request. In one example, the output scheduler 102b' for a given egress port can apply a First Fit Accepting (FFA) policy in which priority is given to a given pairing request based on the VOQ length $m_j$.

Additional examples and description of the QPS algorithm (without the sliding window operation) can be found in Gong et. al., "Queue-proportional sampling: A better approach to crossbar scheduling for input-queued switches," Proceedings of the ACM on Measurement and Analysis of Computing Systems 1, no. 1 (2017): 1-33 and Gong et al., "QPS-r: A Cost-Effective Crossbar Scheduling Algorithm and Its Stability and Delay Analysis," In Proceedings of the EAI VALUETOOLS (2020), which are incorporated by reference.

The sliding window operation ensures that a certain number of matching computations (preferably T matching computations) are performed for each QPS-propose stage 202 (e.g., at current time slot t). Each of the T matching computations can have a window of T time slots (210) to match an available slot in the pairing request of an ingress port. In some embodiments, the matching computation employs a bipartite algorithm.

In the example shown in FIG. 1, as egress ports 108 route packets from respective VOQs of ingress ports 106 based on the schedule 118 at current time slot t, the input port scheduler 102a' for a given ingress port 106 can send a pairing request from a sampled VOQ to the output port scheduler 102b' of an egress port 108 of that sampled VOQ. The output port scheduler 102b' can evaluate the pairing request and any other pair requests received during the same time slot and accept one or more of the pairing requests. For each accept operation, the output port scheduler 102b' can schedule one or more slots for a given egress port. That is multiple time slots can be scheduled from a pairing request received from a single ingress port, or multiple time slots can be scheduled from multiple pairing requests (up to T pairing requests as each output port has T time slots that could be filled) received from multiple ingress ports. The scheduled time slots provide the egress ports with schedules for the routing between time slot t+1 and time slot t+T−1. At the conclusion of the current time slot t, the current window is moved to t+1, which becomes t. In embodiments in which the schedule 118a is implemented as a circular buffer, the increment in the time slot from t to t+1 can be performed by moving a current time pointer of the current time slot to the next time slot in the circular buffer. Because the scheduling window (shown as "Current window" 212) is incremented or traverses one time-slot (shown as "Next window" 214), it has the properties of a sliding window. In the example shown in FIG. 1, indeed, the packets being routed at the current time slot t were scheduled prior to the current slot time t (e.g., up to t-T time slots ago). In the preferred embodiment, and as shown in FIG. 2, the QPS-propose stage 202 and the accept stage 204 are performed in the same time slot t. In other implementations, the accept stage 204 can be performed in a time slot (e.g., t+1) after the time slot (e.g., t) that the QPS-propose stage is performed. The accept operation can be modified to take into account other policies, e.g., quality of service (QOS).

To carry out an FFA operation in O(1) time, in some embodiments, the availability information of an input port i can be represented and transmitted as a T-bit-long bitmap $B_i$ [1 . . . . T], where $B_i$ [t]=1 if input port i is available (i.e., not already matched with an output port) at time slot t and $B_i$ [t]=0 otherwise. The availability information of an output port o is similarly encoded into a T-bit-long bitmap $B_o$ [1 . . . . T]. When input port i sends a pairing request, which contains the availability information $B_i$ [1 . . . . T], to output port o, the corresponding FFA operation is for the output port o to find the first bit in the bitmap $(B_i \& B_o)$ [1 . . . . T] that has value 1, where "&" denotes bitwise-AND. Because the sliding window size T can be a small constant (say T=16), both bitmaps can fit into a single CPU word, and "finding the first 1" is an instruction on most modern CPUs.

The message complexity of each "propose-accept" iteration is O(1) messages per input or output port because each input port sends at most one proposing message per iteration, and each output port sends out at most a pre-defined maximum acceptance message. Each proposing message is T+[$\log_2$ W] bits long (T bits for encoding the availability information and [log2W] bits for encoding the corresponding VOQ length), where W is the longest possible VOQ length. Each acceptance message is [$\log_2$ T] bits long (for encoding the time slot the pairing is to be made).

Figure 4:
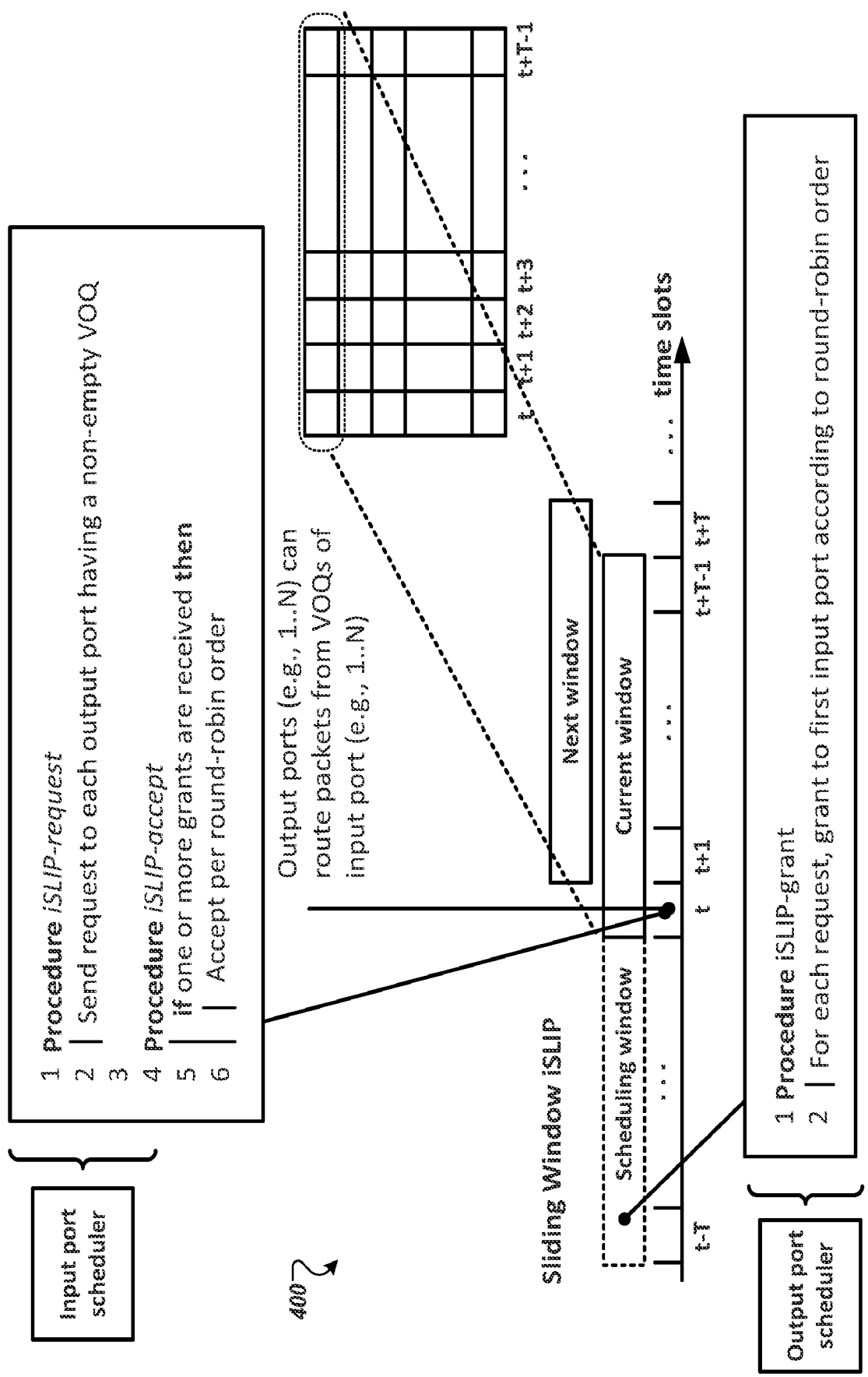
FIG. 4 shows an example scheduler configured as sliding window iSLIP scheduler for the input-queued switch of FIG. 1 in accordance with an illustrative embodiment.
Figure 5:
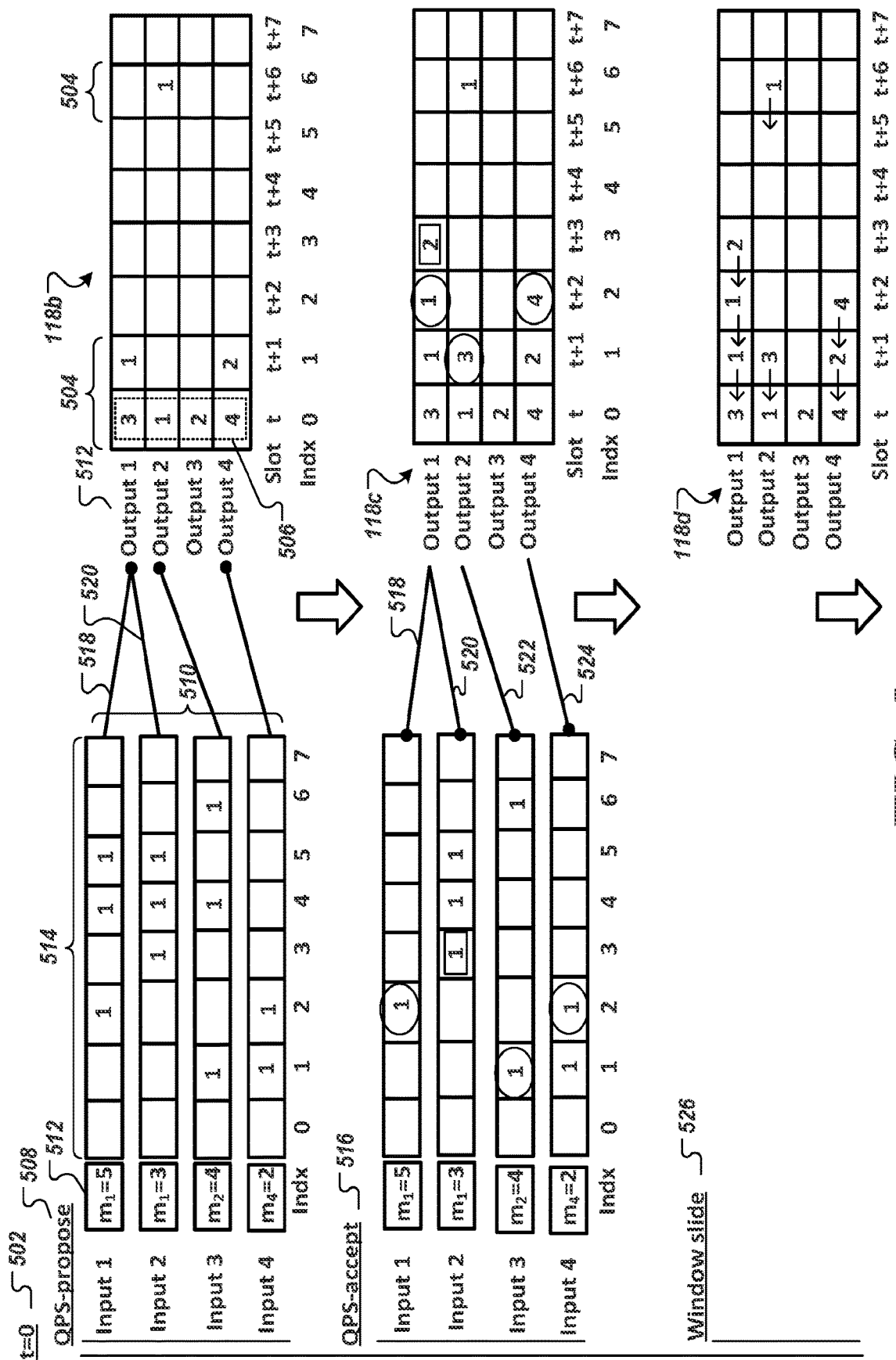
FIG. 5 shows an illustrative example of the operation to the sliding window queue proportional scheduler described in FIG. 4 in accordance with an illustrative embodiment.

FIG. 5 shows an illustrative example of the operation to the sliding window queue proportional scheduler 200 described in FIG. 4. In the example shown in FIG. 5, scheduling operation over time slot "t=0" 502 is shown. Schedule 118 (shown as 118b) includes scheduled time slots 504 for input ports {1 . . . 4}. At the start of the current time slot t=0, output ports "1," "2," "3," and "4" can use the schedule 118b to output packets from VOQs of input ports "3," "1," "2," and "4," (506) respectively. In the QPS-propose state 508, four pairing requests 510 are shown sent from four input ports {1 . . . 4}. The VOQ $m_j$ can be sent following selection of VOQ j (corresponding to output port j) at the input ports based on a random sampling $m_j/m$. Each of the pairing requests includes a VOQ length value (512) and a set of availability spots shown as a bit vector/map (514) of "1"s and "0"s (only "1" shown in the example of FIG. 5).

In the QPS accept stage 516, the scheduler of the egress port performs matching computations for the transmitted pairing requests. At output "1" (512), two pairing requests (518 and 520) are received from input "1" and "input 2." Because input "1" has a longer VOQ length (shown as "$m_1$=5" as compared to "$m_1$=3"), the scheduler first assesses whether the availability slots at the bitmap index "2," "4," and "5" of input "1" matches (e.g., via a bit-AND operator) to available slots in the schedule 118b. In the example, the scheduler matches slots at the bitmap indexes "2" of input "1" and sends an accept message 518. The accept message (e.g., 518) can include the number of matched bits corresponding to the number of packets in the VOQ of the input port that can be sent per its broadcasted availability. The scheduler of output port "1" also matches a slot at index "3" of input "2" and send an accept message 520 to input "2." Output port "2" matches slots at bitmap indexes "1" of input "3" and sends an accept message 522. Output port "4" matches a slot at bitmap index "2" of input "4" and sends an accept message 524. While the index "2" was matched, the first available packet in the VOQ of input port "4" would be sent at t+2. Indeed, T matching operations can be performed for a given pairing request using the bit operator.

The updated schedule following the QPS-accept stage 516 is shown as schedule 118c. Subsequent to the QPS-accept stage 516, the window slide stage 526 is performed. In the example shown in FIG. 5, schedule 118d is shown shifting ("sliding") by one time-slot. In actual implementation, a pointer to the current time slot can be incremented by 1 for a circular buffer that implements the schedule (e.g., 118b-118d).

Sliding Window Queue Proportional Scheduler (SW-QPS)

Figure 3:
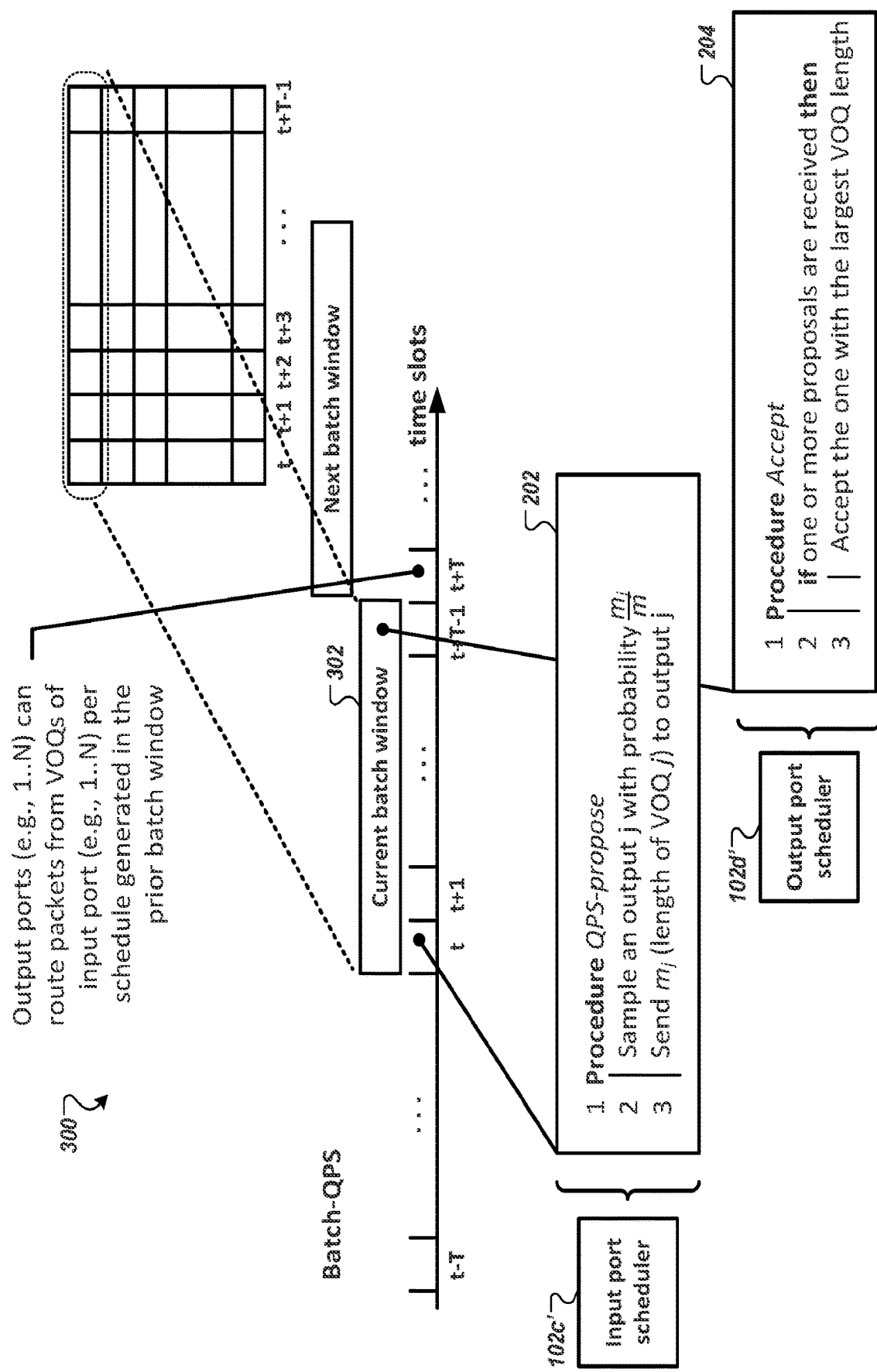
FIG. 3 shows an example scheduler configured as a batch window queue proportional scheduler for the input-queued switch of FIG. 1 in accordance with an illustrative embodiment.

FIG. 3 shows an example scheduler 102 (shown as input scheduler 102c' and output scheduler 102d') configured as a batch window queue proportional scheduler 300 for the input-queued switch of FIG. 1 in accordance with an illustrative embodiment. In the example shown in FIG. 3, the same QPS propose stage 202 and QPS accept stage 204 as described in relation to FIG. 2 can be performed.

The batch window operation also ensures that a certain number of matching computations (preferably T matching computations) are performed for each QPS-propose stage 202 (e.g., at current time slot t). However, rather than the output ports 106 performing the routing at the current time slot t to time slot t+T-1, the schedule for the batch window 302 is first established during this time period (302). Consequently, the batch scheduler introduces a minute delay corresponding to the current batch window 302.

Sliding Window iSLIP Scheduler

FIG. 4 shows an example scheduler 102 configured as sliding window iSLIP scheduler 400 for the input-queued switch of FIG. 1 in accordance with an illustrative embodiment. The SW-iSLIP scheduler 400 can beneficially perform one iSLIP iteration every time slot and output a crossbar schedule every time slot, which improves upon the O(log N) iterations in the original iSLIP algorithm.

The operation of SW-iSLIP is similar to that of SW-QPS, as shown in FIG. 1. In addition, both algorithms can use and compute a joint calendar (e.g., 118) containing T N cells (T time slots×N output ports). In addition, both algorithms can perform one scheduling iteration every time slot. In addition, the joint calendar is configured to operate as a sliding window in that, during every time slot, the oldest row of cells is employed by the crossbar schedule for the next time slot, and simultaneously a new row of cells are figuratively added to the joint calendar. As discussed above, a circular buffer is preferably implemented to which a pointer to the current time slot can be incremented.

For each time slot, SW-iSLIP is configured to perform three phases: a requesting phase, a granting phase, and an accepting phase. In contrast to SW-QPS, with SW-iSLIP, the roles of the input port scheduler and output port scheduler are reversed. The output port scheduler, which maintains schedule 118, is configured to send the set of availability slots to the input port scheduler in the granting phase. The input port scheduler performs the scheduling in the accept phase. In addition, the input port scheduler also initially sends requests for the availability slots from the output port schedulers in the requesting phase.

Requesting phase. Each input port i sends requests to all output ports to which the corresponding VOQ of that input port i is not empty.

Granting phase. Each output port j, upon receiving requests from at least one input port, grants to the first input port encountered in a round-robin order. This round-robin order is enforced through a grant pointer that records the identifier of the input port to which a grant was accepted, e.g., during the most recent time slot when this situation occurred (called "last time"). For example, suppose its grant pointer value is g, which means output port j paired with g-1 the last time; then the time output port j scans input ports g, g+1, ..., N, 1 (=N+1), 2, ..., g-1 for the first input port that has at least one outstanding (not yet scheduled) packet destined for output port j. The nomenclature "1 (=N+1)" can be stated as "1 (N+1 wraps around to 1)" in which port 1 is referred to as N+1. In addition, suppose in this example, input port i' is to receive a grant from output port j. Then this grant contains the identifier of its sender j and the availability information. The availability information (e.g., in a bitmap or bit vector) can indicate that out of the T time slots in the window, the slots available for output port j to pair with an input port.

Accepting phase. Each input port i does the following when receiving at least one grant. First, it sorts these grants in a round-robin order. This round-robin order is enforced similarly to the one in the granting phase through an accept pointer, which records the identifier of the output port from whom a grant was accepted, during the most recent time slot when this situation occurred (e.g., last time). Second, for each grant (in the sorted order), the scheduler tries to accommodate the grant using the First Fit Accepting (FFA) policy. Suppose the grant is from output port j to input port I, the FFA strategy is to match the output port j with input port i at the earliest time slot (in the window of T time slots) during which both are available (for pairing). If such a match can be made, then the joint calendar and the corresponding grant and accept pointers are updated. Otherwise, the two ports have a schedule conflict over all T time slots, and this grant is rejected.

Additional examples and descriptions of the iSLIP algorithm (without the sliding window operation) can be found in Mckeon et. al., "The iSLIP Scheduling Algorithm for Input-Queued Switches," IEEE/ACM TRANSACTIONS ON NETWORKING, VOL. 7, NO. 2, April 1999, which is incorporated by reference.

Experimental Results and Examples

Two studies were conducted: one to evaluate the performance of the SW-QPS and batch-QPS algorithms, and the second to evaluate the performance of the SW-iSLIP algorithm.

SW-QPS Results.

To investigate the mean delay performances and the scaling of SW-QPS with respect to N, the study fixed the number of input and output ports N to 64. To accurately measure throughput and delay, the study established that each VOQ has an infinite buffer size, so no packet is dropped at any input port. Each simulation was run following the stopping rule described in [6, 8], and the number of time slots simulated was at least 500 N2 to guarantee the difference between the estimated and the actual average delays to be within 0.01 time slots with at least 0.98 probability. The study assumed that each traffic arrival matrix A (t) is independent and identically distributed (i.i.d.) Bernoulli with its traffic rate matrix equal to the product of the offered load and a traffic pattern matrix (defined next). Similar Bernoulli arrivals were studied in [7, 9, 14].

For the batch and window size T, the study evaluated different values of T for batch-QPS and SW-QPS. The study observed that a small T=16 provides an optimal performance-cost trade-off for both. For batch-QPS, a large batch size T can provide higher quality matching that can lead to better throughput performances and result in longer batching delays that can lead to overall delay performances. In addition, because the availability information in a proposal message is T bits long, a larger T can result in a longer proposal message that can lead to higher communication complexity. For SW-QPS, because there is no batching delay, the cost of increasing T for SW-QPS is the larger proposal message size. The study nonetheless observed that T=16 also provides an optimal performance-cost trade-off point.

Throughput Performance Results. The study investigated burst traffic arrivals. Four standard types of normalized traffic patterns are used (with each row or column sum equal to 1): (i) uniform, (ii) quasi-diagonal, (iii) log-diagonal, and (iv) diagonal. Uniform: packets arriving at any input port go to each output port with a probability 1/N. Quasi-diagonal: packets arriving at input port i go to output port j=i with probability $$\frac{1}{2}$$

and go to any other output port with probability $$\frac{1}{2(N-1)}.$$

Log-diagonal: packets arriving at input port i go to output port j=i with probability $$\frac{(2N-1)}{2N-1}$$

and go to any other output port j with probability equal ½ of the probability of output port j−1 (note: output port 0 equals output port N). Diagonal: packets arriving at input port i go to output port j=i with probability $$\frac{2}{3},$$

or go to the output port (i mod N)+1 with probability $$\frac{1}{3}.$$

These traffic patterns are listed in order of how skewed the volumes of traffic arrivals to different output ports are: from uniform being the least skewed, to diagonal being the most skewed.

Table 1 presents a maximum achievable throughput of batch-QPS and SW-QPS. The performance for iSLIP and QPS [9] algorithm was also evaluated.

TABLE 1

| Traffic | Uniform | Quasi-Diagonal | Log-Diagonal | Diagonal |
|---|---|---|---|---|
| SW-QPS | 92.56% | 91.70% | 91.40% | 87.74% |
| Batch-QPS | 86.88% | 87.10% | 87.31% | 86.47% |
| iSLIP | 99.56% | 80.43% | 83.16% | 82.96% |
| QPS-1 | 63.54% | 66.60% | 68.78% | 75.16% |

It can be observed in Table 1 that SW-QPS significantly improves the throughput performance of QPS-1, increasing it by an additive term of 29%, 25%, 23%, and 13% for the uniform, quasi-diagonal, log-diagonal, and diagonal traffic patterns, respectively. In addition, it can be observed that the throughput of SW-QPS is consistently higher than that of batch-QPS under the four traffic patterns. It can also be observed that under all traffic patterns except uniform, SW-QPS significantly outperforms iSLIP, which is much more expensive computationally as it runs log2 N iterations for each matching computation.

Figure 6A:
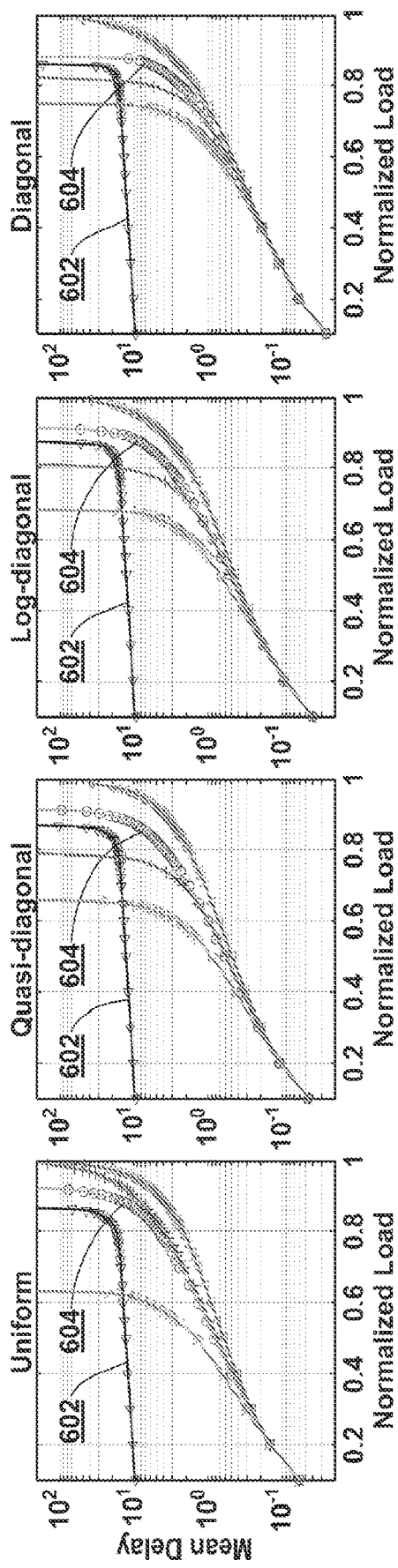
FIGS. 6A, 6B, 6C shows simulated performance of SW-QPS with respect to delay performance, scalability with sliding window size, and bursty traffic.

Delay Performance. FIG. 6A shows the mean delay performance of batch-QPS (shown as "SB-QPS" 602), SW-QPS (604), iSLIP, QPS-1, and MWM under the four traffic patterns. It can be observed in FIG. 6A that, when the offered load is not very high (e.g., less than 0.6), batch-QPS has a much higher mean overall delay than others, likely due to its batching delay that is still relatively quite high (despite a small batch size of T=16). It can also be observed that SW-QPS outperforms QPS-1 and iSLIP under all traffic patterns except uniform.

Figure 6B:
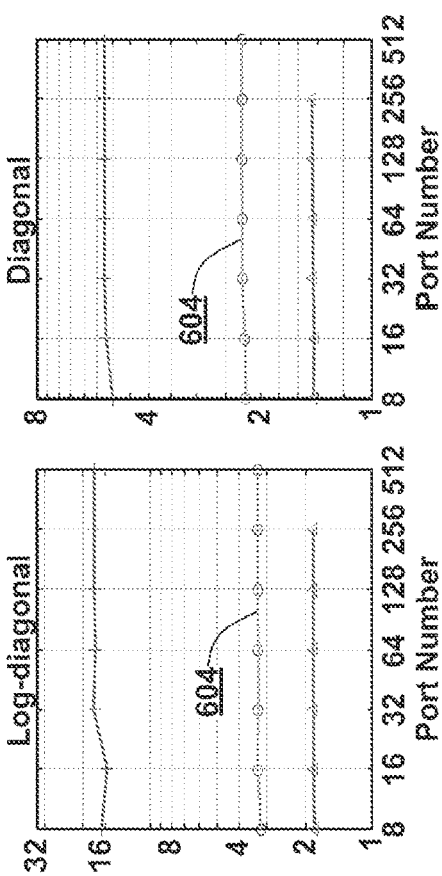
Figure 6B:
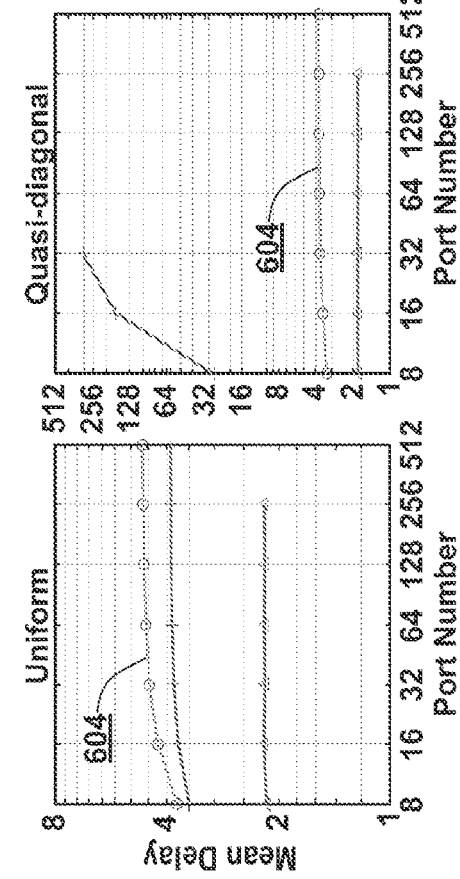

Scaling of Mean Delay with N. The study investigated the scaling of the mean delays of SW-QPS, iSLIP, QPS [9], and MWM with the number of input/output ports N under (non-bursty) i.i.d. Bernoulli traffic. FIG. 6B shows the simulation results under the different traffic patterns under an offered load of 0.8. The study simulated seven different N values: N=8, 16, 32, 64, 128, 256, 512. In FIG. 6B, it can be observed that the mean delays of SW-QPS (604), like those of MWM, are almost independent of N. It can also be observed that that the maximum achievable throughputs of SW-QPS are also almost independent of N.

Figure 6C:
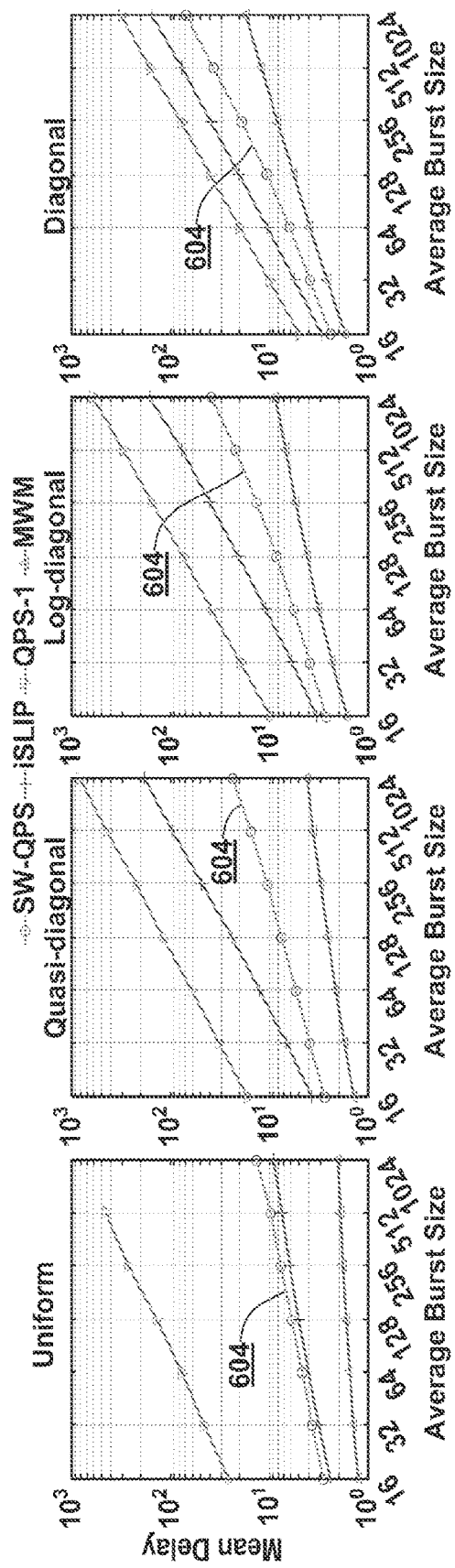

Bursty Arrivals. FIG. 6C shows simulated mean-delay performance results for bursty arrival scenarios. It can be observed that SW-QPS (604) outperforms iSLIP (under all traffic patterns except uniform) and QPS [9] (under all traffic patterns) by an increasingly wider margin in both absolute and relative terms as the average burst size becomes larger.

In real networks, packet arrivals can be bursty. The study evaluated the performances of SW-QPS, iSLIP, QPS-1, and MWM under bursty traffic, generated by a two-state ON-OFF arrival process. The duration of each ON (burst) stage and OFF (no burst) stage are geometrically distributed: the probabilities that the ON and OFF states last for t≥0 time slots are given by $P_{ON}(t)=p(1-p)^t$ and $P_{OFF}(t)=q(1-q)^t$, with the parameters p, q∈ (0, 1) respectively. As such, the average duration of the ON and OFF states are (1−p)/p and (1−q)/q time slots, respectively. In an OFF state, an incoming packet's destination (i.e., output port) is generated according to the corresponding traffic pattern. In an ON state, all incoming packet arrivals to an input port would be destined to the same output port, thus simulating a burst of packet arrivals. By varying p, the study can control the desired average burst size. And by adjusting q, the study can control the load of the traffic. The study evaluated the mean delay performances of these four algorithms, with the average burst size ranging from 16 to 1,024 packets, under a moderate offered load of 0.6 and a heavy offered load of 0.8, respectively.

SW-iSLIP Results.

As a second part of the study, the study simulated the throughput and delay performances of SW-iSLIP against iSLIP under various load conditions and traffic patterns. The study shows that SW-iSLIP has much better throughput performances than iSLIP under three over four patterns and comparable performance in the fourth traffic pattern. The traffic patterns are listed in order of how skewed the volumes of traffic arrivals to different output ports are: from uniform being the least skewed, to diagonal being the most skewed.

Figure 7A:
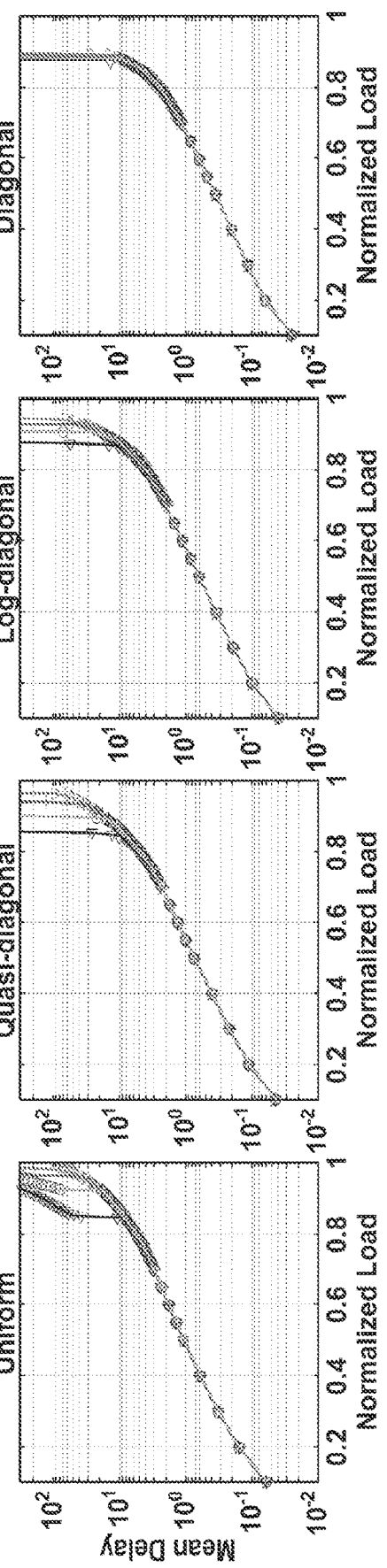
FIGS. 7A, 7B, 7C shows simulated performance of SW-iSLIP with respect to delay performance, scalability with sliding window size, and bursty traffic.

Window Sizes. FIG. 7A shows the simulated delay performance of SW-iSLIP under different sliding window sizes T. In FIG. 7A, the mean delays are shown versus the window sizes under i.i.d. Bernoulli traffic arrivals. It can be observed from FIG. 7A that T=32 provides an optimal performance-cost trade-off in which the batching delay is reasonably low and the proposal message size is small when T=32, yet the throughput gains when increasing T beyond 32 (say to 64) are marginal. The study evaluated the value of window size T from 8 to 64. A larger batch size T generally results in matchings of higher qualities and hence leads to better throughput performances. However, since the availability information in a proposal message is T bits long, a larger T leads to higher communication complexity.

Table 2 shows the simulated maximum achievable throughput of SW-iSLIP against iSLIP for various standard traffic patterns with an offered load of 0.9999. It can be observed that the throughputs of SW-iSLIP are significantly higher than those of iSLIP under all traffic patterns except uniform, although the latter is much more expensive computationally as it runs $\log_2 N$ iterations for each matching computation.

TABLE 2

| Traffic | Uniform | Quasi-Diagonal | Log-Diagonal | Diagonal |
|---|---|---|---|---|
| SW-iSLIP | 98.44% | 94.07% | 92.79% | 88.68% |
| iSLIP | 99.56% | 80.43% | 83.16% | 82.96% |

Figure 7B:
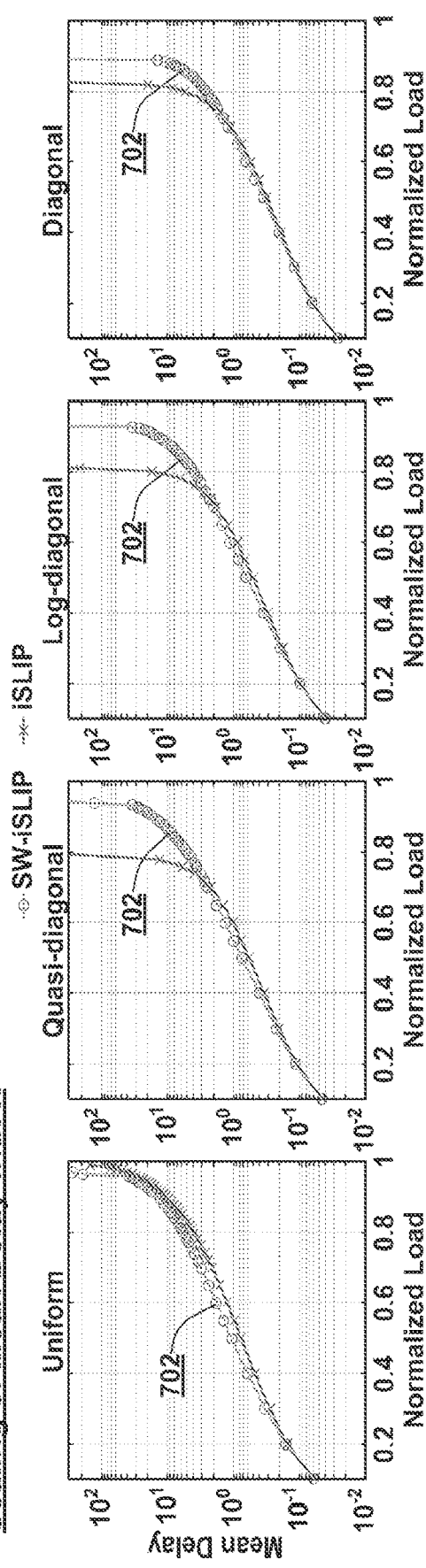

Delay Performance. FIG. 7B shows the simulated mean delays performance of SW-iSLIP (702) compared to iSLIP under various traffic patterns. It can be observed that when the offered load is not very high (say <0.75), both SW-iSLIP and iSLIP have similar delay performances. However, under high offered loads, the delays of SW-iSLIP (702) are significantly lower than those of iSLIP under all simulated traffic patterns except uniform. The study performed the simulation for mean delays versus the number of (input/output) ports under i.i.d. Bernoulli traffic arrivals (offered load: 0.75).

Scaling of Mean Delay with N. The study investigated the scaling of the mean delays of SW-iSLIP (702) and iSLIP with the number of input/output ports N under (non-bursty) i.i.d. Bernoulli traffic. FIG. 6B shows the simulation results under the different traffic patterns under an offered load of 0.75. The study simulated seven different N values: N=8, 16, 32, 64, 128, 256, 512. In FIG. 7B, it can be observed that the mean delays of SW-iSLIP (702), like those of MWM, are almost independent of N. It can also be observed that that the mean delays of SW-iSLIP are almost independent of N, so T does not appear to grow with N (to deliver similar throughput and delay performances). It can also be observed that the maximum achievable throughputs of SW-iSLIP are also almost independent of N.

Figure 7C:
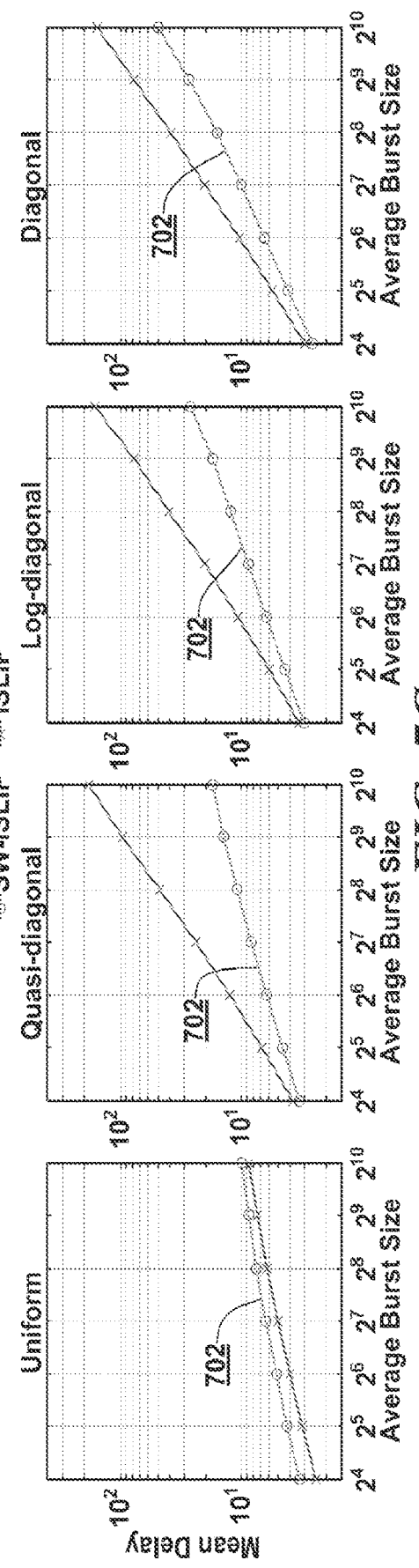

Bursty Arrivals. FIG. 7C shows simulated mean-delay performance results for bursty arrival scenarios. It can be observed that SW-iSLIP (702) outperforms iSLIP (under all traffic patterns except uniform) by an increasingly wider margin in both absolute and relative terms as the average burst size becomes larger. The study also evaluated the mean delay performances of the four algorithms, with the average burst size ranging from 16 to 1,024 packets, under a moderate offered load of 0.6 and a heavy offered load of 0.8, respectively.

Discussion

An exemplary system is configured with a batch switching algorithm (batch-QPS) and sliding window QPS (as well as sliding window iSLIP) that can address the weaknesses of existing batch switching algorithms. It can attain a high-throughput of over 85%, under various traffic load patterns, using only a small batch size of T=16 time slots or sliding window of T=16. This small batch size can provide better delay performances than those of existing batch switching algorithms. Batch-QPS and SW-QPS (and SW-sSLIP) can be fully distributed such that the matching computation load can be efficiently divided evenly across the 2N input and output ports. As a result, its time complexity is the lowest possible: O(1) per matching computation per port.

The design of the batch-QPS, SW-QPS, SW-iSLIP is quite eloquent. Only T rounds of request-accept message exchanges by the input and the output ports are generally employed for the computing of the T matchings used (as the crossbar configurations). In batch QPS and SW-QPS, in each round, each input port i sends a pairing request to an output port that is sampled (by input port i) in a random queue-proportional fashion. Each output port j is sampled with a probability proportional to the length of the corresponding VOQ. For this reason, the algorithm can also be referred to as small-batch QPS. Since each QPS operation can be performed in O(1) time using a simple data structure as shown in [9], the time complexity of batch-QPS is O(1) per matching computation per port.

Batch-QPS and SW-QPS differ from QPS as described in [9]. While QPS [9] is used as an auxiliary component to other switching algorithms such as iSLIP and SERENA [7], QPS is a primary building block for batch-QPS and SW-QPS. While batch-QPS has a much smaller batching delay than other batch switching algorithms due to its much smaller T, the batching delay accounts for the bulk of the total packet delay under light to moderate traffic loads, when all other delays are comparatively much smaller. SW-QPS has the same high performance as batch-QPS while mitigating the batching delay to zero. That is, it has the same O(1) time complexity and can achieve better throughput and delay performances than batch-QPS.

SW-QPS solves the switching problem under a framework called sliding-window switching. A sliding-window switching algorithm is different than a batch algorithm in that a batch of T matchings can produce matching every T time slots. In contrast, in a sliding window switching algorithm, each window is still of size T, but a single matching is produced every time slot, just like in a regular switching algorithm. That is, at the beginning of time slot t, the sliding window contains matchings-under-computation for the T time slots t, t+1, . . . , t+T−1. The "leading edge of the window," corresponding to the matching for the time slot t can be used as the crossbar configuration for the current time slot t. Then at the end of time slot t, a new and currently empty matching is added to the "tail end of the window." The matching can be computed in the next T time slots to provide a high-quality matching by the time t+T.

Both batch-QPS and SW-QPS can reduce the batch and sliding window size without sacrificing the throughput performance much and reduce the time complexity to O(1) via parallelization.

The SB-QPS Algorithm. Batch-QPS can use a small constant batch size T that is independent of N. Batch-QPS is a parallel iterative algorithm: The input and output ports run T QPS-like iterations (request-accept message exchanges) to pack the joint calendar collaboratively. The operation of each iteration can be simple: Input ports request for cells in the joint calendar, and output ports accept or reject the requests. More precisely, each iteration of batch-QPS, like that of QPS [9], consists of two phases: a proposing phase and an accepting phase.

QPS algorithm. Batch-QPS and SW-QPS employ a different accepting phase at an output port than that in QPS [9]. While QPS [9] allows at most one proposal to be accepted at any output port, batch QPS and SW-QPS allow an output port to accept multiple (up to T) proposals (as each output port has up to T cells in its calendar to be filled). The operations at each output port depend on the number of proposals it receives. If an output port receives exactly one proposal from an input port, SW-QPS and batch-QPS will try to accommodate this proposal using the accepting strategy.

In batch-QPS and SW-QPS, opportunities—in the form of proposals from input ports—can arise throughout the time window (up to T time slots long) for computing the join calendar to fill any of its TN cells. The greedy attempt to fill the joint calendar allows batch-QPS and SW-QPS to produce matchings of much higher qualities than a regular switching algorithm that is based on the same underlying bipartite matching algorithm can. Indeed, batch-QPS and SW-QPS can significantly outperform QPS [9].

The time complexity of batch-QPS and SW-QPS for the accepting phase at an output port is O(1) on average, although in theory, it can be as high as O(N log N) since an output port can receive up to N proposals and have to sort them based on their corresponding VOQ lengths. Like in [9], this time complexity can be made O(1) even in the worst case by letting the output port drop ("knock out") all proposals except the earliest few (say 3) to arrive. In an example, this threshold is set to 3 and was found to have a negligible effect on the quality of resulting matchings.

To carry out an FFA operation in O(1) time, in batch-QPS and SW-QPS, the availability information of an input port i can be encoded as a T-bit-long bitmap $B_i$ [1 .... T], where $B_i$ [t]=1 if input port i is available (i.e., not already matched with an output port) at time slot t and $B_i$ [t]=0 otherwise. The availability information of an output port o is similarly encoded into a T-bit-long bitmap $B_o$ [1 .... T]. When input port i sends a proposal, which contains the availability information $B_i$ [1 .... T], to output port o, the corresponding FFA operation is for the output port o to find the first bit in the bitmap ($B_i$&$B_o$) [1 .... T] that has value 1, where "&" denotes bitwise-AND. Since the batch size T in batch-QPS is a small constant (say T=16), both bitmaps can fit into a single CPU word, and "finding the first 1" is an instruction on most modern CPUs.

To summarize, the worst-case time complexity of batch-QPS and SW-QPS can be O(T) per input or output port for the joint calendar consisting of T matchings, since batch-QPS and SW-QPS can run T iterations and each iteration has O(1) worst-case time complexity per input or output port. Hence the worst-case time complexity for computing each matching is O(1) per input or output port.

The message complexity of each "propose-accept" iteration is O(1) messages per input or output port because each input port sends at most one proposing message per iteration and each output port sends out at most three acceptance messages (where 3 is the "knockout" threshold explained above). Each proposing message is T+[log2W] bits long (T bits for encoding the availability information and [log2W] bits for encoding the corresponding VOQ length), where W is the longest possible VOQ length. Each acceptance message is [log2 T] bits long (for encoding the time slot, the pairing is to be made).

Background Many present-day switching systems in Internet routers and datacenter switches employ an input-queued crossbar to interconnect their input ports and output ports. In an N×N input-queued crossbar switch, each input port has N Virtual Output Queues (VOQs). A VOQ j at input port i serves as a buffer for the packets going into input port i destined for output port j. The use of VOQs solves the Head-of-Line (HOL) blocking issue [13], which severely limits the throughput of input-queued switches.

In an N×N input-queued crossbar switch, each input port can be connected to only one output port and vice versa in each switching cycle or time slot. Hence, in every time slot, the switch needs to compute a one-to-one matching (i.e., the crossbar schedule) between input and output ports. A major research challenge of designing high-link-rate switches with a large number of ports (called high-radix [3]) is to develop switching algorithms that can compute "high quality" matchings—those that result in high switch throughput and low queueing delays for packets—in a short time slot.

While many switching algorithms have been proposed for input-queued switches, they either have a (relatively) high time complexity that prevents a matching computation from being completed in a short time slot or cannot produce high-quality matchings that translate into excellent throughput and delay performances. For example, the widely-used iSLIP algorithm can empirically achieve over 80% throughputs under most of the traffic patterns. However, even with a parallel iterative implementation, its time complexity per port is O(log2 N), which is still too high when the switch size N is large and the time slot is short (say a few nanoseconds long).

It is possible to improve the quality of the matching without increasing the time complexity of the switching algorithm using a strategy called batching [1, 16, 18]. Unlike in a regular switching algorithm, where a matching decision is computed for every time slot, in a batch switching algorithm, multiple (say T) consecutive time slots are grouped as a batch, and these T matching decisions are batch-computed. Hence, in a batch switching algorithm, each of the T matchings-under-computation in a batch has a period of T time slots to find opportunities to have the quality of the matching improved by the underlying bipartite matching algorithm, whereas in a regular switching algorithm, each matching has only a single time slot to find such opportunities. As a result, a batch switching algorithm can usually produce matchings of higher qualities than a regular switching algorithm using the same underlying bipartite matching algorithm because such opportunities for improving the quality of a certain matching usually do not all present themselves in a single designated time slot (for a regular switching algorithm to compute this matching). Intuitively, the larger the batch size T is, the better the quality of a resulting matching is since a larger T provides a wider "window of opportunities" for improving the quality of the matching as just explained.

However, existing batch switching algorithms are not without shortcomings. They all suffer from at least one of the following two problems. First, all existing batch switching algorithms except are serial algorithms, and it is not known whether any of them can be parallelized. As a result, they all have a time complexity of at least O(N) per matching computation since it takes O(N) time just to "print out" the computed result. This O(N) time complexity is clearly too high for high-radix high-line-rate switches. Second, most existing switching algorithms require a large batch size T to produce high-quality matchings that can lead to high throughputs. For example, it was reported in that the batch size had to be 3,096 (for N=300 ports) for the algorithm to attain 96% throughputs under some traffic patterns. A large batch size T is certain to lead to poor delay performance: Regardless of the offered load condition, the average packet delay for any batch switching algorithm due to batching is at least T/2, since any packet belonging to the current batch has to wait till at least the beginning of the next batch to be switched.

MWM Switching Algorithms. Using MWM (Maximum Weighted Matching) as crossbar schedules are known to result in 100% switch throughput and near-optimal queueing delays under various traffic patterns [15], but each MWM match takes $O(N^{2.5} \log W)$ time to compute using the state-of-the-art algorithm [4], where W is the maximum possible length of a VOQ. Motivated by this, various parallel exact or approximate MWM algorithms (e.g., [2, 5]) have been proposed to reduce its time complexity. However, the time complexities of all these algorithms above are still too high to be used in high-line-rate high-radix switches.

The family of parallel iterative algorithms [10-12, 14] generally has a low time complexity per port. However, their throughput and delay performances are generally much worse than those of MWM. It is noted that QPS-r [10], the state-of-the-art algorithm in this family, also builds on QPS [9]. It simply runs r (a small constant) iterations of QPS to arrive at a final match.

Batch Switching Algorithms. Most of the existing batch switching algorithms [1, 16, 18] model the process of packing the joint calendar as an edge-coloring problem, but until now, most practical solutions to the latter problem are centralized and have high complexity. For example, the Fair-Frame algorithm based on the Birkhoff von Neumann Decomposition (BvND) has a time complexity of $O(N^{1.5} \log N)$ per matching computation.

A recent work, based on parallel edge coloring, has been proposed in [18]. It pushes the per-port time complexity (per matching computation) down to O(log N). It requires a batch size of only O(log N), so the constant factor hidden in the big-O is very large.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

Although example embodiments of the present disclosure are explained in some instances in detail herein, it is to be understood that other embodiments are contemplated.

The following patents, applications and publications as listed below and throughout this document are hereby incorporated by reference in their entirety herein.

[1] G. Aggarwal, R. Motwani, D. Shah, and An Zhu. 2003. Switch Scheduling via Randomized Edge Coloring. In Proceedings of the IEEE FOCS. 502-512.

[2] M. Bayati, B. Prabhakar, D. Shah, and M. Sharma. 2007. Iterative Scheduling Algorithms. In Proceedings of the IEEE INFOCOM. 445-453.

[3] C. Cakir, R. Ho, J. Lexau, and K. Mai. 2016. Scalable High-Radix Modular Crossbar Switches. In Proceedings of the HOTI. 37-44.

[4] R. Duan and H. Su. 2012. A Scaling Algorithm for Maximum Weight Matching in Bipartite Graphs. In Proceedings of the ACM-SIAM SODA. 1413-1424.

[5] M. Fayyazi, D. Kaeli, and W. Meleis. 2004. Parallel Maximum Weight Bipartite Matching Algorithms for Scheduling in Input-Queued Switches. In Proceedings of the IEEE IPDPS (New Mexico, USA). 4-11.

[6] J. M. Flegal, G. L. Jones, et al. 2010. Batch Means and Spectral Variance Estimators in Markov Chain Monte Carlo. The Annals of Statistics 38, 2 (2010), 1034-1070.

[7] P. Giaccone, B. Prabhakar, and D. Shah. 2003. Randomized Scheduling Algorithms for High-Aggregate Bandwidth Switches. IEEE J. Sel. Areas Commun. 21, 4 (2003), 546-559.

[8] P. W. Glynn, W. Whitt, et al. 1992. The Asymptotic Validity of Sequential Stopping Rules for Stochastic Simulations. Ann. Appl. Probab. 2, 1 (1992), 180-198.

[9] L. Gong, P. Tune, L. Liu, S. Yang, and J. Xu. 2017. Queue-Proportional Sampling: A Better Approach to Crossbar Scheduling for Input-Queued Switches. Proceedings of the ACM SIGMETRICS 1, 1 (June 2017), 3:1-3:33.

[10] Long Gong, Jun Xu, Liang Liu, and Siva Theja Maguluri. 2020. QPS-r: A Cost-Effective Crossbar Scheduling Algorithm and Its Stability and Delay Analysis. In Proceedings of the EAI VALUETOOLS.

[11] B. Hu, F. Fan, K. L. Yeung, and S. Jamin. 2018. Highest Rank First: A New Class of Single-Iteration Scheduling Algorithms for Input-Queued Switches. IEEE Access 6 (2018), 11046-11062.

[12] B. Hu, K. L. Yeung, Q. Zhou, and C. He. 2016. On Iterative Scheduling for Input-Queued Switches With a Speedup of 2-1/N. IEEE/ACM Trans. Netw. 24, 6 (December 2016), 3565-3577.

[13] M. Karol, M. Hluchyj, and S. Morgan. 1987. Input Versus Output Queueing on a Space-Division Packet Switch. IEEE Trans. Commun. 35, 12 (1987), 1347-1356.

[14] Nick Mckeown. 1999. The iSLIP Scheduling Algorithm for Input-queued Switches. IEEE/ACM Trans. Netw. 7, 2 (April 1999), 188-201.

[15] N. Mckeown, A. Mekkittikul, V. Anantharam, and J. Walrand. 1999. Achieving 100% Throughput in an Input-Queued Switch. IEEE Trans. Commun. 47, 8 (August 1999), 1260-1267.

[16] M. J. Neely, E. Modiano, and Y. S. Cheng. 2007. Logarithmic Delay for Nx N Packet Switches Under the Crossbar Constraint. IEEE/ACM Trans. Netw. 15, 3 (June 2007), 657-668.

[17] D. Shah and D. Wischik. 2006. Optimal Scheduling Algorithms for Input-Queued Switches. In Proc. of the IEEE INFOCOM. 1-11.

[18] L. Wang, T. Ye, T. Lee, and W. Hu. 2018. A Parallel Complex Coloring Algorithm for Scheduling of Input-Queued Switches. IEEE Trans. Parallel Distrib. Syst. 29, 7 (2018), 1456-1468.

What is claimed is:

1. A network switch comprising:
   a plurality of input ports and a plurality of output ports operatively interconnected to one another in a crossbar, wherein each of the plurality of input ports comprises a plurality of virtual output queue (VOQ) buffers that are mapped to an output port, wherein each of the plurality of VOQ buffers is configured to store a plurality of packets received at a given input port of the plurality of input ports;
   an input port scheduler configured, via computer-readable instructions or logic configuration implemented at each input port of the plurality of input ports, to at each switching cycle, send a pairing request to an output port associated with a VOQ buffer of an input port, and wherein the pairing request includes i) an indication of a VOQ length for the VOQ buffer and ii) availability slots corresponding to availability of the plurality of input ports; and
   an output port scheduler configured, via computer-readable instructions or logic configuration implemented at each output port of the plurality of output ports, to at the each switching cycle or a pre-defined subsequent switching cycle, if receiving a pairing request, (i) receive one or more pairing requests from a corresponding set of one or more input ports, (ii) select one or more pairing requests among the one or more received pairing requests that can fit in an available time slot in a sliding window of available time slots (T, comprised of a first available time slot t, and additional time slots t+1, . . . , t+T−1) using the indication of the VOQ length and the availability slots, and (iii) send an accept message to an input port associated with the selected pair request,
   wherein, at a beginning of time slot t, the sliding window contains matchings-under-computation for the T time slots t, t+1, . . . , t+T−1 such that a leading edge of the sliding window, corresponding to the matching for the time slot t, is used as the crossbar configuration for time slot t, then at an end of time slot t, a new and currently empty matching is added to a tail end of the sliding window so that matchings can be computed in a next T of time slots to provide a matching by time t+T, and
   wherein the plurality of output ports receives packets from the plurality of input ports over the crossbar to direct the packets to pre-defined destinations according to a schedule defined by the input port scheduler and the output port scheduler.

2. The network switch of claim 1, wherein an input port scheduler of a first input port of the plurality of input ports is configured to compute a queue-proportional sampling distribution for the first input port as a plurality of ratios associated with a VOQ buffer, and wherein each ratio of the plurality of ratios is determined as (i) a number of packets in a given VOQ buffer to (ii) a total number of packets in the VOQ buffers of the first input port, and wherein the VOQ buffer is randomly selected according to the queue-proportional sampling distribution.

3. The network switch of claim 1, wherein the pairing request is selected in an available time slot in the sliding window of available time slots.

4. The network switch of claim 3, wherein the pairing request having a longest VOQ packet length is selected in the available time slot.

5. The network switch of claim 1, wherein the output port scheduler is configured to select (i) the selected pair request as a first selected pair request and (ii) a second selected pairing request within a same switching cycle.

6. The network switch of claim 5, wherein the selection of the first selected pair request and the second selected pairing request is based on a first-fit-accepting (FFA) policy.

7. The network switch of claim 1, wherein the network switch is configured as an Internet router or a datacenter switch.

8. The network switch of claim 1, wherein the pairing request includes a bitmap of the availability slots.

9. The network switch of claim 8, wherein the output port scheduler maintains a bitmap of the sliding window of available time slots.

10. The network device of claim 9, wherein the output port scheduler is configured to perform a bit operation between the bitmap of availability slots and the bitmap of the sliding window of available time slots to perform the selecting of the one or more pairing requests.

11. A method comprising:
    providing a plurality of input ports and a plurality of output ports operatively interconnected to one another in a crossbar, wherein each of the plurality of input ports comprises a plurality of virtual output queue (VOQ) buffers that are mapped to an output port, wherein each of the plurality of VOQ buffers is configured to store a plurality of packets received at a given input port of the plurality of input ports;
    at each input port of the plurality of input ports, and at each switching cycle, sending a pairing request to an output port associated with a VOQ buffer of an input port, wherein the VOQ buffer has at least one packet, and wherein the pairing request includes i) an indication of a VOQ length for the VOQ buffer and ii) availability slots corresponding to availability of the plurality of input ports; and
    at each output port of the plurality of output ports, and at the each switching cycle or a pre-defined subsequent switching cycle, (i) receiving one or more pairing requests from a corresponding set of one or more input ports, (ii) selecting one or more pairing requests among the one or more received pairing requests that can fit in an available time slot in a sliding window of available time slots (T, comprised of a first available time slot t, and additional time slots t+1, . . . , t+T−1) using the indication of the VOQ length and the availability slots, and (iii) sending an accept message to an input port associated with the selected pair request,
    wherein, at a beginning of time slot t, the sliding window contains matchings-under-computation for the T time slots t, t+1, . . . , t+T−1 such that a leading edge of the sliding window, corresponding to the matching for the time slot t, is used as the crossbar configuration for time slot t, then at an end of time slot t, a new and currently empty matching is added to a tail end of the sliding window so that matchings can be computed in a next T of time slots to provide a matching by time t+T, and wherein the plurality of output ports receive packets from the plurality of input ports over the crossbar to direct the packets to pre-defined destinations according to a schedule defined by the input port scheduler and the output port scheduler.

12. The method of claim 11, wherein an input port scheduler of a first input port of the plurality of input ports is configured to compute a queue-proportional sampling distribution for the first input port as a plurality of ratios associated with a VOQ buffer, and wherein the queue-proportional sampling distribution is determined as a ratio of (i) a number of packets in a given VOQ buffer to (ii) a total number of packets in the VOQ buffers of the input port.

13. The method of claim 11, wherein the pairing request is selected in an available time slot in the sliding window of available time slots.

14. The method of claim 13, wherein the pairing request having a longest VOQ packet length is selected in the available time slot.

15. The method of claim 11, further comprising:
selecting a second selected pairing request within a same time slot with the selected pair request as a first selected pair request.

16. The method of claim 15, wherein the selection of the first selected pair request and the second selected pairing request is based on a first-fit-accepting (FFA) policy.

17. The method of claim 11, wherein the pairing request includes a bitmap of the availability slots.

18. The method of claim 17, wherein the output port scheduler maintains a bitmap of the sliding window of available time slots.

19. The method of claim 18, wherein the output port scheduler is configured to perform a bit operation between the bitmap of availability slots and the bitmap of the sliding window of available time slots to perform the selecting of the one or more pairing requests.

20. A network switch comprising:
a plurality of input ports and a plurality of output ports operatively interconnected to one another in a crossbar, wherein each of the plurality of input ports comprises a plurality of virtual output queue (VOQ) buffers that are mapped to an output port, wherein each of the plurality of VOQ buffers is configured to store a plurality of packets received at a given input port of the plurality of input ports;

an output port scheduler configured, via computer-readable instructions or logic configuration implemented at each output port of the plurality of output ports, to at each switching cycle, send a pairing request to an output port associated with a VOQ buffer of an input port, wherein the VOQ buffer has at least one packet, wherein the pairing request includes a list of one or more availability slots corresponding to availability of the plurality of input ports; and an input port scheduler configured, via computer-readable instructions or logic configuration implemented at each input port of the plurality of output ports, to at the each switching cycle or a pre-defined subsequent switching cycle, if receiving a pairing request, (i) receive one or more pairing requests from a corresponding set of one or more output ports, (ii) select one or more pairing requests among the one or more received pairing requests that can fit in an available time slot in a sliding window of available time slots (T, comprised of a first available time slot t, and additional time slots t+1, . . . , t+T−1) using the list of one or more availability slots, and (iii) send an accept message to an output port of the plurality of output ports that is associated with the selected pair request, wherein, at a beginning of time slot t, the sliding window contains matchings-under-computation for the T time slots t, t+1, . . . , t+T−1 such that a leading edge of the sliding window, corresponding to the matching for the time slot t, is used as the crossbar configuration for time slot t, then at an end of time slot t, a new and currently empty matching is added to a tail end of the sliding window so that matchings can be computed in a next T of time slots to provide a matching by time t+T, and wherein the plurality of output ports receives packets from the plurality of input ports over the crossbar to direct the packets to pre-defined destinations according to a schedule defined by the input port scheduler and the output port scheduler.

\* \* \* \* \*